Nov. 21, 1944.   H. I. REISKIND   2,363,361
CONTROL TRACK STABILIZING METHOD AND SYSTEM
Filed Oct. 26, 1942
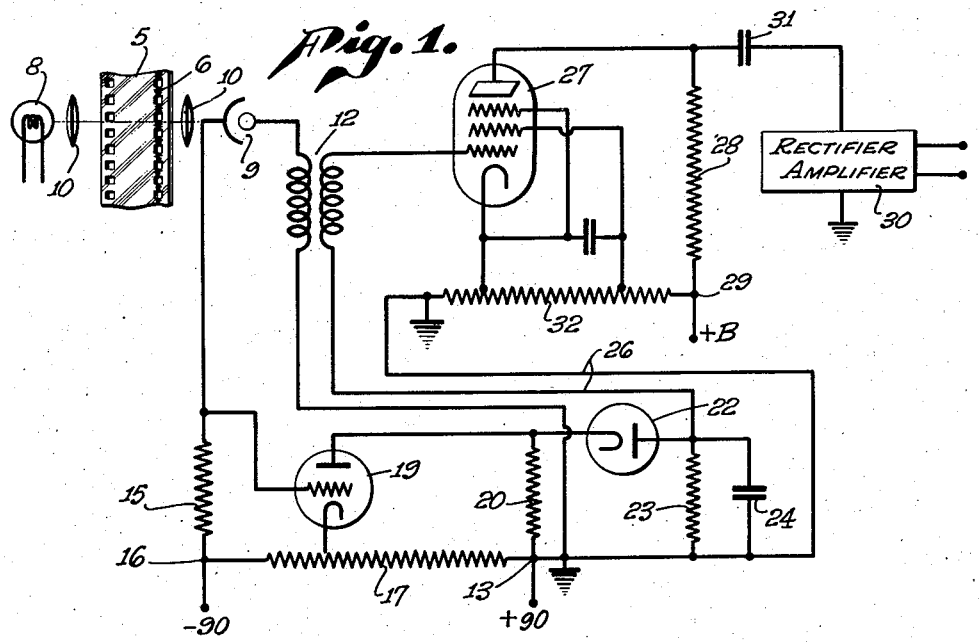
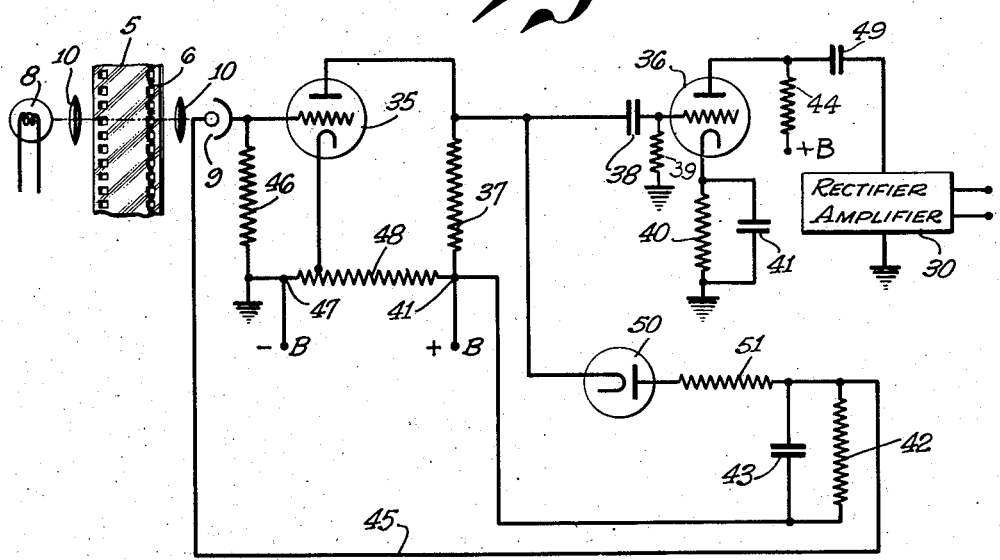
Inventor
Hillel I. Reiskind
By
Orl R. Goshaw
Attorney Patented Nov. 21, 1944

2,363,361

UNITED STATES PATENT OFFICE 2,363,361

CONTROL TRACK STABILIZING METHOD AND SYSTEM

Hillel I. Reiskind, Indianapolis, Ind., assignor to Radio Corporation of America, a corporation of Delaware Application October 26, 1942, Serial No. 463,345

9 Claims. (Cl. 179—100.3)

This invention relates to sound reproducing systems and particularly to the reproduction of sound under control of a separate track record.

To enhance the exhibition of sound motion pictures, the amplitude range of the normal sound track, which is limited by the sound track area, is increased in accordance with some predetermined pattern pertinent to the scenes being projected. This increase in amplitude range is usually accomplished by varying the gain of the amplifying units for the sound record, the variations in gain being under control of a separate control track. Since the standard motion picture film area between the film perforations is completely utilized by the pictures and the normal sound record, the control track or record has been placed in the film areas between the sprocket holes. Such a control track system is disclosed and claimed in Burrill Patent No. 2,270,260, dated January 20, 1942. The system of this patent utlizes a separate scanning system for the control track in the sprocket hole area of the film, the output current being detected or rectified and filtered and used for varying the gain of one or more of the amplifier tubes in the sound track transmission circuit.

In the use of such a control track system it is essential that once the gain has been adjusted to provide a desired predetermined range, the reproduced amplitudes should not be subject to variation due to changes in the light intensity of the scanning beam or to variations in the sensitivity of the photoelectric cell. The present invention is directed to a system for preventing such variations from affecting the predetermined adjustment of the system, its principal object being to maintain a photographic record of the reproducing system stable and independent of any variation of the scanning light intensity and photocell sensitivity.

Another object of the invention is to provide a control track system which is self-regulating with respect to variations in the scanning light intensity and photocell sensitivity.

A further object of the invention is to provide a photographic record scanning system which varies its output in a manner and direction to compensate for variations in photocell sensitivity and light beam intensity.

A further object of the invention is to provide an amplifier for a control record, the gain of the amplifier being varied in a direction to neutralize variations in photocell sensitivity and in the light beam intensity.

Although the novel features which are believed to be characteristic of this invention will be pointed out with particularity in the appended claims, the manner of its organization and the mode of its operation will be better understood by referring to the following description read in conjunction with the accompanying drawing forming a part thereof in which:

Fig. 1 is a schematic circuit diagram of one embodiment of the invention, and

Fig. 2 is a schematic circuit diagram of another embodiment of the invention.

Referring now to Fig. 1, a film 5 is shown with a control track 6 thereon interposed between a light source 8, a photocell 9 and lenses 10 diagrammatically representing a scanning system, the details of such a system being shown in the above mentioned Burrill patent. Although the film 5 is shown with only a control track 6, it is to be understood that the film may also carry a picture and/or a standard sound track intermediate the film perforations.

The anode of the photocell 9 is connected through the primary of an audio transformer 12 to the +90 terminal 13. The cathode of the photocell 9 is connected through a resistance 15 to the —90 terminal 16, the +90 terminal 13 and —90 terminal 16 being interconnected by a potentiometer resistance 17. Connected across resistance 15 and a portion of the potentiometer resistance 17 is a D. C. amplifier tube 19 (which may be a triode or pentode) having a load resistance 20, the voltage variations across which are impressed upon a rectifier tube 22. Across the output of the rectifier 22 is a timing circuit composed of a resistance 23 and a condenser 24 and which is connected over conductors 26 and the secondary of transformer 12 to the control grid of a standard exponential tube 27. Thus, current variations in the output circuit of the rectifier 22 will vary the biasing potential on the tube 27 and thereby vary its gain in accordance with the output of rectifier 22.

The rectifier 22, resistance 23 and condenser 24 form a peak reading system and the voltage developed across 23—24 is proportional to the peak voltage developed across resistance 15, which in turn is proportional to the photocell current output of the cell 9 during the period that the sprocket hole portion of the film is being scanned. This output of the rectifier 22 is so poled that increased illumination on the photocell or an increase in the photocell sensitivity will increase the voltage across the resistance 23 and condenser 24, thus reducing the gain of the amplifier tube 27 and maintaining the output of this tube as a function of the control track amplitude only. For decreases in the light beam intensity and a decrease in the photocell sensitivity, the gain of amplifier 27 is increased proportionally.

The anode of tube 27 is connected over an output resistance 28 to the +B terminal at 29, the voltage variations across the resistance 28 being impressed on a rectifier-amplifier unit 30 over condenser 31, as shown in detail in the above-mentioned Burrill patent. Potentials for the other electrodes of the amplifier 27 are obtained across a potentiometer resistance 32.

Thus, the system of Fig. 1 maintains the output of amplifier 27 directly proportional to the control track amplitude by varying the gain of the amplifier to counteract changes in the scanning elements which would normally vary the control track amplitudes. Thus, compensation is obtained for variations in the intensity of the light striking the cell and in the sensitivity of the cell itself, providing a particularly stable system and one independent of variations in vacuum tube gain after it is once adjusted.

Referring to Fig. 2, a system to provide similar results to those produced by the system of Fig. 1 is shown, the system of Fig. 2 obtaining stabilization control by varying the anode voltage of the photoelectric cell 9, since the sensitivity of a gas photocell is a function of its anode potential. Thus, in Fig. 2 we have the control track film 5, light source 8 and photocell 9 as shown in Fig. 1, the photocell 9 being directly connected to a direct current amplifier tube 35. The output of the tube 35 is impressed upon a second amplifier tube 36 across a plate circuit resistance 37 of tube 35 and over a condenser 38 and a grid resistor 39. The output of the tube 36 is impressed on the rectifier-amplifier unit 30 over a plate resistor 44 and coupling condenser 49 as shown in Fig. 1, the tube 36 having a biasing resistance 40 shunted by a condenser 41.

The anode potential circuit for the cell 9 is from the +B terminal 41 over a resistance 42 shunted by a condenser 43 and a conductor 45 to the anode of photocell 9, and then from the cathode of the cell 9 over a resistance 46 to the —B terminal 47, the proper biasing and anode potential for the tube 35 being obtained across a potentiometer resistance 48. Bridged across the anode resistor 37 of direct current amplifier 35 is a rectifier tube 50 with its load resistance 51 and a timing circuit composed of resistance 42 and condenser 43, these elements forming a peak reading system. The light through the "hole" portions of the control track when impressed on the cell 9 causes an increase in voltage drop across the resistance 37 and the voltage thus produced across resistor 42 is therefore proportional to the photocell current during this portion of the scanning cycle. As the film illumination or photocell sensitivity increases, the voltage across resistor 42 increases, which reduces the polarizing voltage applied to the photocell 9. As a change in voltage across resistor 46 will produce a change in voltage across 42, this circuit is degenerative in nature and the output of the photocell is maintained substantially constant, the input to the amplifier tube 36 being dependent only on the amplitude variations of the control track itself. The degenerative feature makes the system independent of variations in vacuum tube gains after it is once adjusted. To obtain peak reading results, the value of resistor 51 should be small with respect to that of resistor 42.

Thus, stability is obtained with both the system of Fig. 2 and that of Fig. 1, the principal difference in the two systems being that in Fig. 2, the control is obtained by varying the anode potential of the photocell 9 while in Fig. 1, the variations in the photocell output due to changes in the light intensity and photocell sensitivity vary the gain of the amplifier 27. Although the above circuits have been described in connection with the reproduction of a sprocket hole control track, it is to be understood that they may be employed in the reproduction of standard sound tracks without noise reduction or tracks wherein the average transmission is always 50 percent. If resistor 51 is large with respect to resistor 42 or resistor 42 is eliminated, the voltage across condenser 43 represents the average transmission of the film and the circuit will stabilize the reproduction of standard control tracks. Such stabilization may also be accomplished with the circuit of Fig. 1 by the same modification.

I claim as my invention:

1. A film track translating system comprising a source of light, a photoelectric cell for detecting variations in said light caused by a film track, an amplifier for the film track currents in the output circuit of said cell, a rectifier for a portion of said film track currents, and means for utilizing the output current of said rectifier for counteracting variations in the intensity of the light from said source and variations in the sensitivity of said cell tending to vary the amplitude of the output currents of said cell.

2. A film track translating system comprising a source of light, a photoelectric cell for detecting variations in said light caused by a film track, an amplifier for the film track currents in the output circuit of said cell, a rectifier for a portion of said film track currents, and means for impressing the output of said rectifier on the gain control electrodes of said amplifier for varying the gain thereof in accordance with variations in light intensity of said source and the sensitivity of said photocell.

3. A photographic record stabilizing system comprising a source of light, a photocell for detecting variations in said light as varied by said record, an amplifier for the record amplitude variations, and means connected to the output circuit of said photocell to vary the gain of said amplifier for counteracting variations in said light beam intensity and photocell sensitivity from predetermined values.

4. A photographic record stabilizing system in accordance with claim 3 in which said last-mentioned means includes a rectifier for said photocell currents, the output thereof controlling the gain of said amplifier.

5. A photographic stabilizing system in accordance with claim 3 in which said last-mentioned means includes a rectifier for said photocell currents, the output thereof controlling the sensitivity of said photocell.

6. A control track stabilizing system comprising a light source, a photocell adapted to detect variations in the light from said source as modified by the control track amplitude variations, a rectifier for rectifying the output of said photoelectric cell, and means for utilizing the output of said rectifier for varying the sensitivity of said cell in a direction to counteract increases and decreases in sensitivity of said photocell and increases and decreases in said scanning light reaching said photocell.

7. A control track stabilizing system in accordance with claim 6 in which an amplifier is provided, said rectifier being bridged across the output circuit of said amplifier.

8. The method of stabilizing the output of a photocell subject to variations in sensitivity and to increases in the peak value of the illumination impinging thereon comprising rectifying a portion of the output of said cell and utilizing the rectified currents to vary the photocell sensitivity in a direction to neutralize the changes in sensitivity of said cell and the changes in the peak value of the illumination thereon.

9. The method of stabilizing the output of a photocell subject to variations in sensitivity and to increases in the peak value of the illumination impinging thereon comprising amplifying the current output of said cell, rectifying a portion of the current output of said cell, and utilizing the rectified current to vary the amplification of said currents being amplified in a direction to neutralize the changes in sensitivity of said cell and the changes in the peak value of the illumination thereon.

HILLEL I. REISKIND.